United States Patent
Truong et al.

(10) Patent No.: US 11,074,912 B2
(45) Date of Patent: Jul. 27, 2021

(54) IDENTIFYING A VALID WAKE INPUT (71) Applicant: Polycom, Inc., San Jose, CA (US)

(72) Inventors: Kwan Truong, Lilburn, GA (US);
Cody Schnacker, Westminster, CO (US); Jesse Coleman, Manchaca, TX (US)

(73) Assignee: Polycom, Inc., San Jose, CA (US)

( * ) Notice: Subject to any disclaimer, the term of this patent is extended or adjusted under 35 U.S.C. 154(b) by 344 days.

(21) Appl. No.: 16/168,692

(22) Filed: Oct. 23, 2018

(65) Prior Publication Data
US 2020/0126547 A1  Apr. 23, 2020

(51) Int. Cl.
*G10L 15/22* (2006.01)
*H04W 4/10* (2009.01)
*G10L 15/08* (2006.01)

(52) U.S. Cl.
CPC ............ *G10L 15/22* (2013.01); *H04W 4/10* (2013.01); *G10L 2015/088* (2013.01); *G10L 2015/225* (2013.01)

(58) Field of Classification Search
CPC combination set(s) only.
See application file for complete search history.

(56) References Cited

U.S. PATENT DOCUMENTS

| | | | |
|---|---|---|---|
| 8,380,521 B1 | 2/2013 | Maganti et al. | |
| 9,275,637 B1* | 3/2016 | Salvador | G10L 15/06 |
| 9,368,105 B1* | 6/2016 | Freed | G10L 15/22 |
| 9,728,188 B1* | 8/2017 | Rosen | G10L 25/51 |
| 10,204,624 B1* | 2/2019 | Knudson | G10L 15/22 |
| 10,304,440 B1* | 5/2019 | Panchapagesan | G10L 15/16 |
| 2014/0222436 A1* | 8/2014 | Binder | G10L 21/16 |
| | | | 704/275 |
| 2015/0053779 A1* | 2/2015 | Adamek | G10L 15/22 |
| | | | 236/1 C |
| 2015/0154953 A1* | 6/2015 | Bapat | G10L 15/06 |
| | | | 704/251 |
| 2016/0019907 A1* | 1/2016 | Buck | G10L 15/20 |
| | | | 704/226 |
| 2017/0309274 A1* | 10/2017 | LeBeau | G06F 3/011 |
| 2018/0204569 A1* | 7/2018 | Nadkar | G10L 15/22 |
| 2019/0130898 A1* | 5/2019 | Tzirkel-Hancock | G06F 3/167 |
| 2019/0179611 A1* | 6/2019 | Wojogbe | H04L 65/40 |
| 2019/0221209 A1* | 7/2019 | Bulpin | G10L 15/08 |
| 2019/0295544 A1* | 9/2019 | Garcia | G06F 3/167 |
| 2019/0371310 A1* | 12/2019 | Fox | G10L 15/08 |
| 2020/0111478 A1* | 4/2020 | Iyer | G10L 15/22 |
| 2020/0389523 A1* | 12/2020 | Tov | H04W 4/80 |

\* cited by examiner

*Primary Examiner* — Abdelali Serrou
(74) *Attorney, Agent, or Firm* — Keith Lutsch PC (57) ABSTRACT

A device includes one or more processor devices, an audio sensor, a speaker device, and one or more memory devices. The audio sensor is configured to generate an audio stream. The one or more memory devices store data including data identifying a wake phrase and instructions. The instructions are executable by the one or more processor devices to initiate, as a result of detecting the wake phrase in the audio stream and determining that the wake phrase is invalid, presentation via the speaker device of audio output identifying a valid wake input. The instructions are further executable by the one or more processors to initiate, as a result of detecting the valid wake input, communication of a portion of the audio stream to a natural language processing service.

16 Claims, 5 Drawing Sheets

IDENTIFYING A VALID WAKE INPUT

TECHNICAL FIELD

The present disclosure relates generally to identifying a valid wake input.

BACKGROUND

Speech recognition systems are becoming increasingly popular means for users to interact with computing devices. A variety of speech recognition services enable users to control such computing devices and gain information without the need for a visual user interface, buttons, or other controls. To illustrate, a speech recognition service can change the channel on a television, control lights or doors, look up news, or perform a variety of other tasks based on detected speech. These speech recognition services often include a local component and a remote component. The local component monitors detected audio for a 'wake phrase.' Upon detection of the wake phrase, the local component transmits a portion of the detected audio to the remote component for further natural language processing. In addition, some local components support a push-to-talk mode. In the push-to-talk mode, the local component transmits portions of the detected audio to the remote component responsive to actuation of a push-to-talk button rather than responsive to a wake phrase.

Unfortunately, users may not know the wake phrase associated with the local component. In addition, the users may not know whether the local component is operating in a push-to-talk mode. Therefore, the users may be unable to use a natural language processing service supported by the local component.

SUMMARY

Systems and methods according to the disclosure enable a device to present output identifying a valid wake input. In some examples, the valid wake input is a valid wake phrase. In other examples, the valid wake input is actuation of a push-to-talk button. The output identifying the valid wake input corresponds to audio output, image output, or a combination thereof.

A device includes one or more processor devices and one or more memory devices. The one or more memory devices store data including data identifying a wake phrase and instructions. The instructions are executable by the one or more processor devices to initiate, as a result of detecting the wake phrase in the audio stream and determining that the wake phrase is invalid, presentation of output identifying a valid wake input. The instructions are further executable by the one or more processors to initiate, as a result of detecting the valid wake input, communication of a portion of the audio stream to a natural language processing service.

A computer readable storage device stores instructions executable by one or more processors to access data identifying a wake phrase. The instructions are further executable by the one or more processors to initiate, as a result of detecting the wake phrase in the audio stream and determining that the wake phrase is invalid, presentation of output identifying a valid wake input. The instructions are further executable by the one or more processors to initiate, as a result of detecting the valid wake input, communication of a portion of the audio stream to a natural language processing service.

A method includes storing data identifying a wake phrase. The method further includes initiating, as a result of detecting the wake phrase in the audio stream and determining that the wake phrase is invalid, presentation of output identifying a valid wake input. The method further includes initiating, as a result of detecting the valid wake input, communication of a portion of the audio stream to a natural language processing service.

BRIEF DESCRIPTION OF THE DRAWINGS

Embodiments described herein are illustrated by way of example and not limitation in the figures of the accompanying drawings, in which like references indicate similar features. It should be understood that the full scope of the inventions disclosed herein are not limited to the precise arrangements, dimensions, and instruments shown. Furthermore, in the drawings, some conventional details have been omitted so as not to obscure the inventive concepts described herein.

DETAILED DESCRIPTION

Reference to the drawings illustrating various views of exemplary embodiments is now made. In the following description, numerous specific details are set forth, such as specific configurations, methods, etc., in order to provide a thorough understanding of the embodiments. At least one of the described embodiments is practicable without one or more of these specific details, or in combination with other known methods and configurations. In other instances, well-known processes and techniques have not been described in particular detail to avoid obscuring the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one implementation. Thus, the appearances of the phrase "in one embodiment," "in an embodiment," "in another embodiment," "in other embodiments," "in some embodiments," or their variations in various places throughout this specification are not necessarily referring to the same embodiment. Furthermore, the particular features, structures, configurations, or characteristics are combinable in any suitable manner in one or more embodiments. In the drawings and the description of the drawings herein, certain terminology is used for convenience only and is not to be taken as limiting the embodiments of the present disclosure. Furthermore, in the drawings and the description below, like numerals indicate like elements throughout.

In the following description and claims, the terms "coupled" and "connected," along with their derivatives, are not intended as synonyms for each other. "Coupled" is used to indicate that two or more elements or components can directly or indirectly communicate with each other. "Connected" is used to indicate that two or more elements or components are directly linked with each other.

Any marks that have been referenced herein is by way of example and shall not be construed as descriptive or to limit the scope of the embodiments described herein to material associated only with such marks.

The present disclosure enables one of skill in the art to provide a system to train a user to use a natural language processing service. The system stores data identifying a wake phrase and monitors audio input for instances of the wake phrase. In response to detecting the wake phrase in an audio stream and determining that the wake phrase is invalid, the system presents instructions identifying valid wake input.

In a first case, the system is configured to transmit audio to a remote component responsive to a particular wake phrase and to present instructions identifying the particular wake phrase based on detecting a wake phrase associated with another natural language processing service. In a particular illustrative example, the system is configured to transmit audio to a remote component for processing in response to detecting "Alexa®" in an audio stream (Alexa is a registered trademark of Amazon Technologies, Inc. of Seattle, Wash.). In response to detecting a wake phrase associated with another service, such as Cortana®, Siri®, etc., the system presents instructions identifying "Alexa" as the wake phrase to use to interact with the system (Cortana is a registered trademark of Microsoft Corporation of Redmond, Wash. and Siri is a registered trademark of Apple Inc. of Cupertino, Calif.).

In a second use case, the system is configured to transmit audio to a remote component responsive to a button press and to present instructions identifying the button press based on detecting a wake phrase associated with a natural language processing service. In a particular illustrative example, the system is configured to transmit audio to a remote component in response to detecting a button press. In response to detecting a wake phrase associated with a natural language service, such as "Alexa," "Cortana," "Siri," etc., the system presents instructions identifying the button press as valid input to use to interact with the system. The same system may operate according to the first and second use cases. For example, the system may be configured to enter or exit a push-to-talk mode based on user input. While in the push-to-talk mode, the system presents instructions identifying the button press responsive to detecting "Alexa" (or "Cortana," "Siri," etc.) in the audio stream. While out of the push-to-talk mode, the system transmits audio to the remote component for processing in response to detecting "Alexa" but presents instructions identifying "Alexa" as valid input responsive to detecting "Cortana," "Siri," etc.

Accordingly, the described systems and methods present instructions identifying valid input so that a user may know how to interact with a natural language system. In particular, the described systems and methods monitor for one or more specific invalid inputs (e.g., common invalid inputs) and identifies one or valid inputs based on detecting the one or more specific invalid inputs. Thus, a user may interact with a natural language service operating according to the disclosure without having prior knowledge of what input is valid. Accordingly, the described systems and methods represent an improvement to a user interface functionality of a computer system.

Figure 1A:
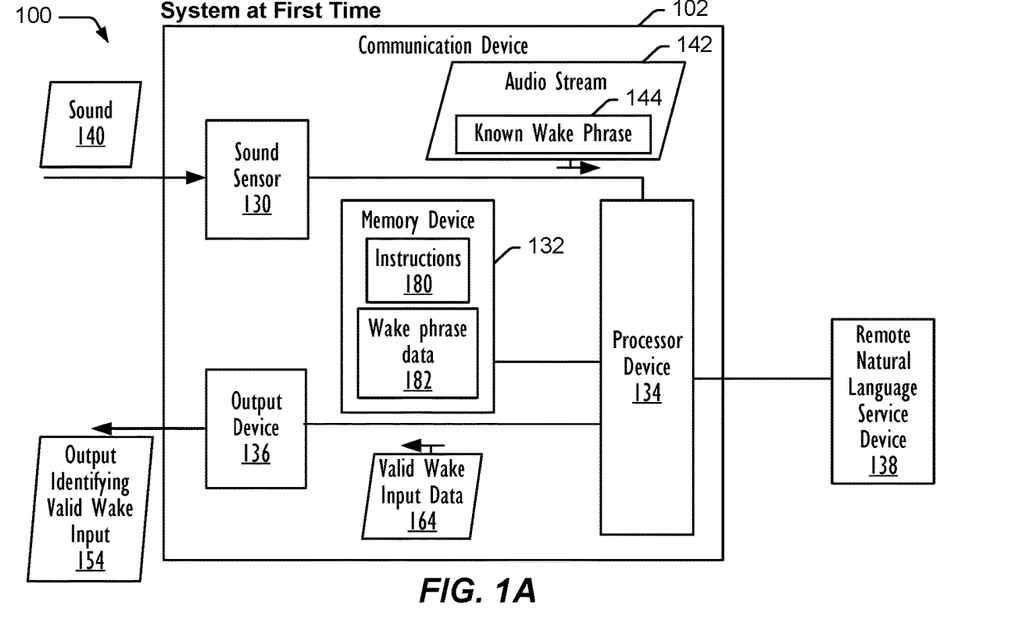
FIG. 1A is a diagram illustrating a natural language processing system presenting instructions identifying valid input at a first time.

FIG. 1A illustrates a natural language processing system 100 that is configured to present instructions identifying valid input. FIG. 1A depicts the system 100 at a first time. The system 100 includes a communication device 102 and a remote natural language service device 138. While shown directly coupled, the communication device 102 and the remote natural language service device 138 may be connected via one or more intermediate devices (e.g., a network, such as the Internet).

The communication device 102 and the remote natural language service device 138 operate together to provide a natural language service. In particular, the communication device 102 is configured to transmit a portion of an audio stream to the remote natural language service device 138 for processing responsive to detecting valid wake input. The remote natural language service device 138 is configured to send one or more commands to one or more devices, return data to the communication device 102, perform one or more other actions, or a combination thereof based on one or more natural language commands included in the portion of the audio stream. For example, in response to detecting a valid wake phrase (e.g., "Alexa"), the communication device 102 begins transmitting an audio stream to the remote natural language service device 138. In response to detecting a natural language command (e.g., "play music") in the audio stream, the remote natural language service device 138 performs one or more commands (e.g., returns a music stream). In some implementations, the communication device 102 corresponds to a teleconference endpoint configured to exchange data with another teleconference endpoint to facilitate a teleconference. The communication device 102 and the remote natural language service device 138 may provide the natural language service during the teleconference.

The communication device 102 includes a sound sensor 130, a memory device 132, a processor device 134, and an output device 136. In some implementations, the communication device 102 includes additional components other than those illustrated. Further, connections between components of the communication device 102 may be different than illustrated. For example, the sound sensor 130, the memory device 132, the processor device 134, and the output device 136 may be indirectly connected to each other via a communication bus. Further, while the processor device 134 is illustrated as directly connected to the remote natural language service device 138, it is understood that the communication device 102 may include a communication interface device (e.g., a network interface card or other type of interface device) that the processor device 134 may use to communicate with the remote natural language service device 138.

The sound sensor 130 includes a microphone (e.g., a condenser microphone, a dynamic microphone, or any other type of microphone) and an analog to digital converter (A/D). In some examples, the sound sensor 130 includes a plurality of microphones and/or a plurality of A/Ds. The sound sensor 130 is configured to generate sound data based on an acoustic signal detected by the sound sensor 130.

The memory device 132 includes a solid state device, a random access memory device, a disk drive, another type of memory, or a combination thereof. In some implementations, the memory device 132 corresponds to a plurality of memory devices.

The processor device 134 corresponds to a digital signal processor (DSP), a central processor unit (CPU), or to another type of processor. In some implementations, the processor device 134 corresponds to a plurality of processor devices. In the illustrative example of FIG. 1, the memory device 132 stores instructions 180. The processor device 134 is configured to execute the instructions 180 to perform one or more operations described herein. The memory device 132 further includes wake phrase data 182. The wake phrase data 182 identifies one or more wake phrases. In some examples, the wake phrase data 182 further indicates whether each wake phrase identified by the wake phrase data 182 is valid (and/or invalid). Further, while not shown, in some examples, the memory device 132 stores a state of the communication device 102. For example, the memory device 132 may store a state identifier that indicates whether the communication device 102 is operating in a push-to-talk mode. Instructions and data illustrated and/or described as being stored in the memory device 132 may be stored in several different devices in examples in which the memory device 132 corresponds to more than one memory device.

The output device 136 includes a speaker, a display device, a digital to analog converter (D/A), or a combination thereof. In some examples, the output device 136 corresponds to a plurality of output devices. The output device 136 is configured to present output based on data received from the processor device 134.

The remote natural language service device 138 corresponds to one or more computing devices. For example, the remote natural language service device 138 may correspond to one or more servers. In some embodiments, the remote natural language service device 138 corresponds to a virtual device provided by one or more devices of a cloud service.

In operation, the sound sensor 130 detects sound 140, generates an audio stream 142 based on the sound 140, and sends the audio stream 142 to the processor device 134. The processor device 134, executing the instructions 180, identifies a known wake phrase 144 based on the wake phrase data 182. In response to the known wake phrase 144 corresponding to invalid wake input, the processor device 134, executing the instructions 180, outputs valid wake input data 164 to the output device 136. In some examples, the processor device 134 identifies that the known wake phrase 144 is invalid based on an indicator in the wake phrase data 182 identifying that the known wake phrase 144 specifically is invalid. In other examples, the processor device 134 identifies that the known wake phrase 144 is invalid based on an indicator (e.g., a state indicator) stored in the memory device 132 identifying that wake phrases generally are invalid. For example, the processor device 134 may determine that the known wake phrase 144 is invalid based on a state indicator stored in the memory device 132 identifying that the communication device 102 is operating in a push-to-talk mode. The state indicator is set by the processor device 134 based on one or more commands received from a user. The one or more commands correspond to one or more spoken commands, input received via graphical user interface, some other type of user input, or a combination thereof. The valid wake input data 164 corresponds to audio and/or graphic data identifying one or more valid wake inputs. In some examples, the processor device 134 identifies the one or more valid wake inputs based on the wake phrase data 182. For example, the wake phrase data 182 may store indicators identifying valid wake phrases. In some examples, the processor device 134 identifies the one or more valid wake inputs based on a state of the communication device 102. For example, based on determining that the communication device 102 is operating in a push-to-talk mode, the communication device 102 may identify that a push-to-talk button is a valid wake input. In some implementations, the memory device 132 may store data identifying a specific button as a push-to-talk button.

In some examples, the processor device 134 stores an indicator of a time that the valid wake input data 164 is generated based on the known wake phrase 144. In such examples, the processor device 134 may ignore future instances of the known wake phrase 144 that occur within a threshold time period of the time.

Based on the valid wake input data 164, the output device 136 outputs output 154 identifying the valid wake input. For example, the output 154 identifying valid wake input may correspond to audio and/or graphic content identifying instructions to say a particular wake phrase or to activate a push-to-talk button. To illustrate, the output 154 identifying valid wake input may include audio corresponding to the phrase "Please say Alexa before inputting a voice command" or "Please use the push-to-talk button to input a voice command." In some examples, the output 154 identifying the valid wake input identifies the detected known wake phrase 144 in addition to valid wake input. To illustrate, the output 154 identifying valid wake input may include audio corresponding to the phrase "I heard you say Cortana. Please say Alexa before inputting a voice command" or "I heard you say Alexa. Please use the push-to-talk button to input a voice command." In a particular use case, a user speaks the spoken command during a teleconference facilitated by the communication device 102.

Thus, FIG. 1A illustrates how the system 100 is configured to educate a user to use valid wake input in order to input voice commands. Accordingly, FIG. 1A represents an improvement to a user interface function of a computing device.

Figure 1B:
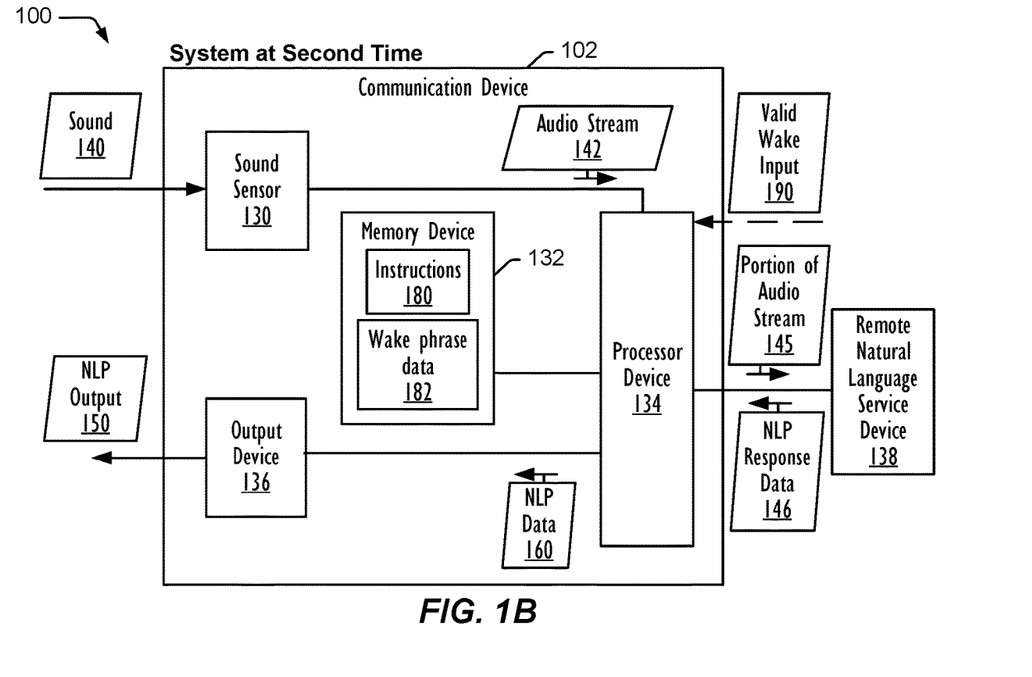
FIG. 1B is a diagram illustrating the system responding to the valid input at a second time.

Referring to FIG. 1B, the natural language processing system 100 is shown at a second time. The second time depicted in FIG. 1B may precede or follow the first time depicted in FIG. 1A. As illustrated in FIG. 1B, the processor device 134 receives valid wake input 190. In some examples, the valid wake input 190 corresponds to the valid wake input identified by the output 154. In an illustrative use case, a user attempts to activate a natural language processing service offered by the communication device 102 by saying "Cortana." In response to recognizing "Cortana" and determining that "Cortana" is not valid wake input, the processor device 134 identifies that "Alexa" is valid wake input and causes the output device 136 to present audio instructions, such as "I heard you say Cortana. Please say Alexa to use voice commands." Subsequently, the user says "Alexa."

Based on receiving the valid wake input 190 (e.g., "Alexa"), the processor device 134 transmits a portion 145 of the audio stream 142 to the remote natural language service device 138. In some examples the portion 145 of the audio stream 142 includes a spoken command, such as "play music." The remote natural language service device 138 processes the portion 145 and attempts to recognize and perform one or more spoken commands in the portion 145. The remote natural language service device 138 returns natural language processing response data 146 that corresponds to a confirmation that a command has been performed, instructions to perform a command, requested data (e.g., media data), an error message, or a combination thereof. Based on the natural language processing data 146, the processor device 134 sends natural language processing data 160 to the output device 136. The output device 136 outputs natural language processing output 150 based on the natural language processing data 160. The natural language processing output 150 corresponds to media (e.g., music, video, speech providing a response to a spoken question/query, etc.) requested by a user, confirmation that a command has been performed, an error message, or a combination thereof.

Thus, FIG. 1B illustrates how the system 100 responds to valid wake input. FIGS. 1A and 1B together illustrate how the system 100 detects invalid wake input and presents instructions identifying valid input. Accordingly, a user may be taught to use valid wake input to access a natural language processing function provided by the system 100. Thus, the system 100 may be more easily used by a user who does not have prior knowledge of valid wake input. Therefore, the system 100 represents an improvement to user interface function of a computing device.

Figure 2:
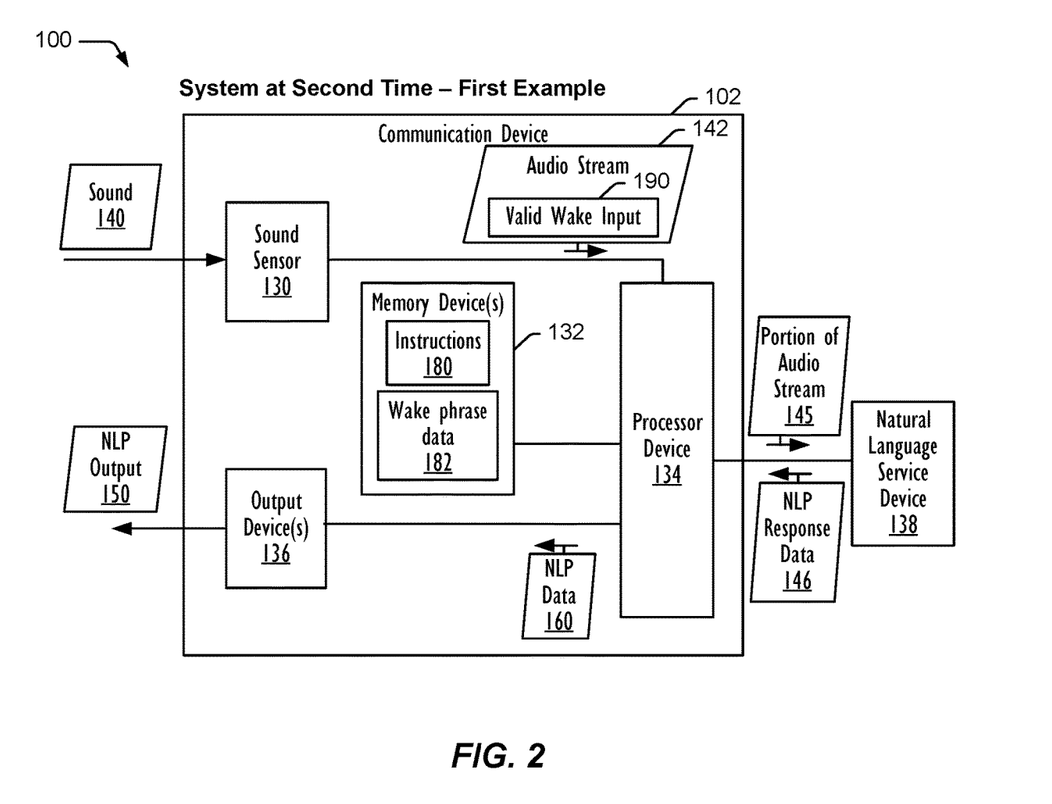
FIG. 2 is a diagram of a first particular example of the system at the second time in which the valid input is a signal indicating actuation of a push-to-talk button.
Figure 3:
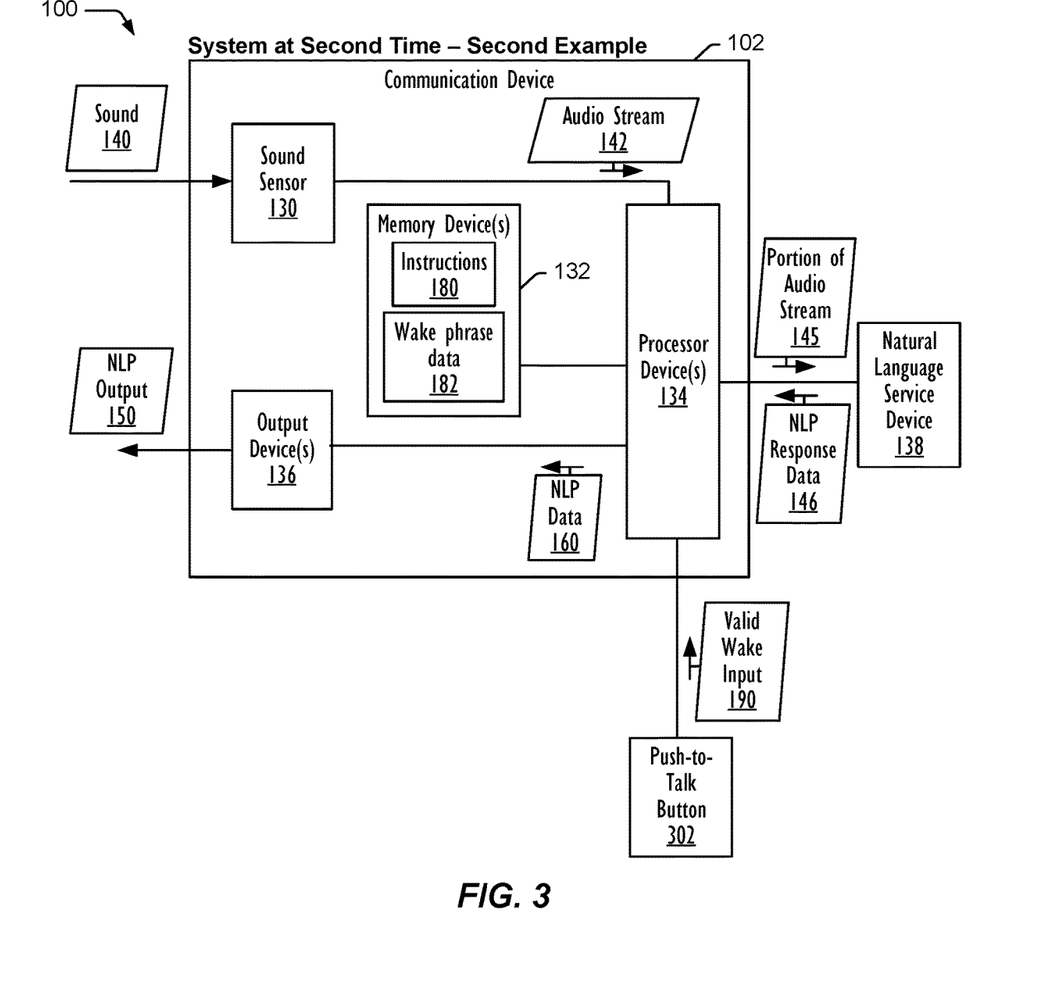
FIG. 3 is a diagram of a second particular example of the system at the second time in which the valid input corresponds to a valid wake phrase in an audio stream.

FIG. 2 illustrates a first particular example of the system 100 at the second time. In the first particular example of the system 100, as depicted in FIG. 2, the valid wake input 190 corresponds to a valid wake phrase included in the audio stream 142. FIG. 3 illustrates a second particular example of the system 100 at the second time. In the second particular example of the system 100, as depicted in FIG. 3, the valid wake input 190 corresponds to a signal from a push-to-talk button 302. Thus, FIGS. 2 and 3 illustrate specific use cases in which a user interacts with the system 100 using a valid wake input. As explained above, the system 100 is configured to identify the valid wake input in response to detecting a known but invalid wake phrase. Accordingly, a user may be taught to use valid wake input to access a natural language processing function provided by the system 100. Thus, the system 100 may be more easily used by a user who does not have prior knowledge of valid wake input. Therefore, the system 100 represents an improvement to user interface function of a computing device.

Figure 4:
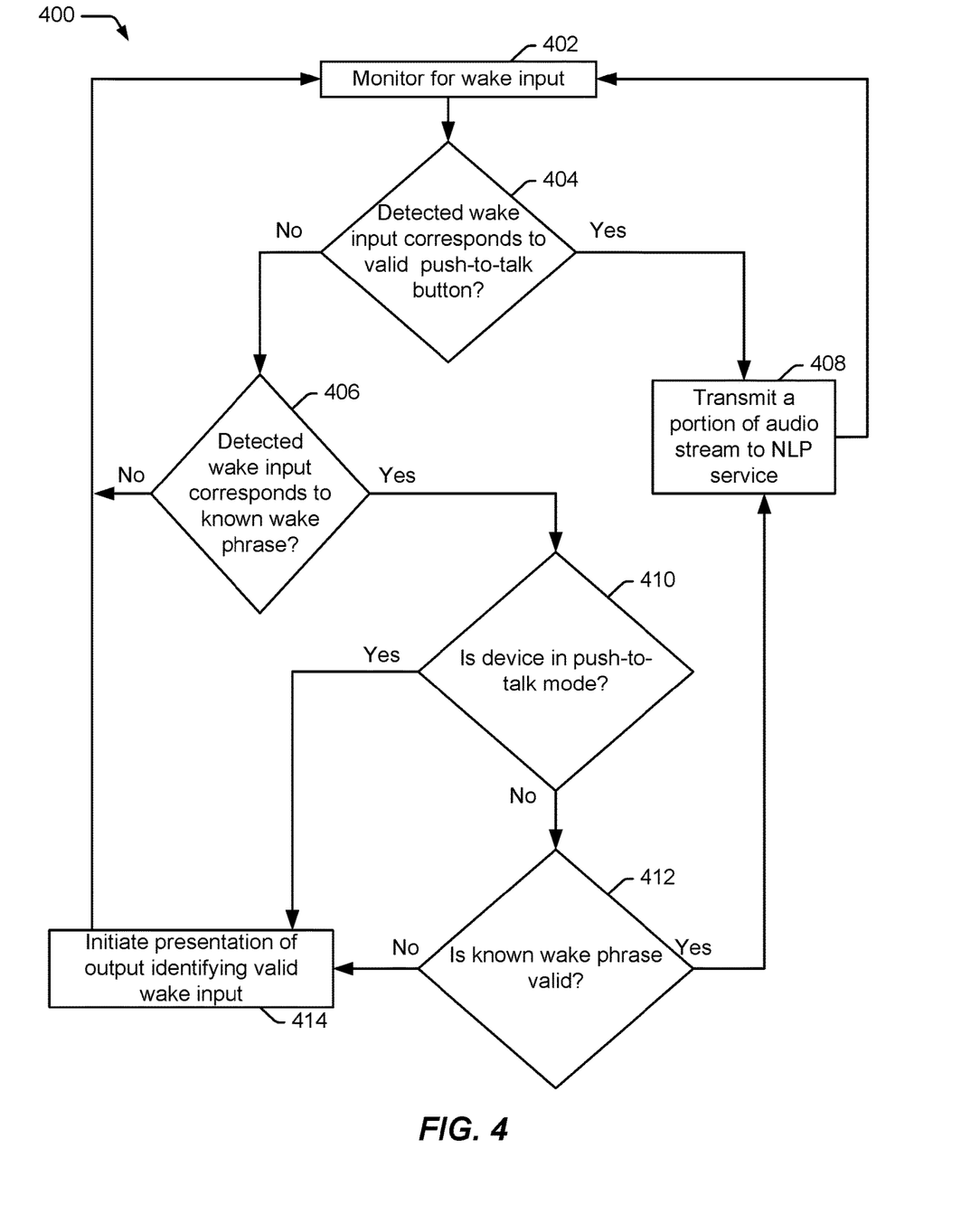
FIG. 4 is a flowchart illustrating a method of presenting instructions identifying valid input.

Referring to FIG. 4, a method 400 for presenting output identifying valid wake input is shown. A communication device, such as the communication device 102, may perform the method 400 to identify wake input. The method 400 includes monitoring for wake input, at 402. In an illustrative example, the processor device 134 executing the instructions 180 monitors for wake input from the sound sensor 130 and/or from the push-to-talk button 302.

The method 400 further includes determining whether detected wake input corresponds to a valid push-to-talk button, at 404. In an illustrative example, the processor device 134 determines whether detected wake input corresponds to a signal indicating actuation of a valid push-to-talk button (e.g., the push-to-talk button 302). In some situations no push-to-talk button is valid. For example, the processor device 134 may not recognize button presses as valid input when operating outside of the push-to-talk mode.

In response to determining that the detected wake input corresponds to the valid push-to talk button, the method 400 includes transmitting a portion of an audio stream to a natural language processing service, at 408, and continuing to monitor for wake input, at 402. In an illustrative example, the processor device 134 transmits the portion 145 of the audio stream 142 to the remote natural language service device 138 based on receiving the valid wake input 190 from the push-to-talk button 302.

In response to determining that the detected wake input does not correspond to a valid push-to-talk button, the method 400 includes determining whether the detected wake input corresponds to a known phrase, at 406. In an illustrative example, the processor device 134 determines whether the audio stream 142 includes a known wake phrase based on the wake phrase data 182.

In response to determining that the detected wake phrase does not correspond to a known phrase, the method 400 includes continuing to monitor for wake input, at 402. In response to determining that the detected wake input corresponds to a known phrase, the method 400 includes determining whether the device is in a push-to-talk mode, at 410. In an illustrative example, the processor device 134 determines whether the communication device 102 is in a push-to-talk mode based on a state indicator stored in the memory device 132.

In response to determining that the device is in the push-to-talk mode, the method 400 includes initiating presentation of output identifying valid wake input, at 414. Since the device is operating in the push-to-talk mode, the valid wake input includes a push-to-talk button. To illustrate, in response to detecting the known wake phrase 144 and determining that the communication device 102 is in the push-to-talk mode, the processor device 134 initiates presentation of the output 154 identifying valid wake input. For example, the output 154 may correspond to an audio message saying "The device is in push-to-talk mode. Please use the push-to-talk button to input voice commands." The method 400 includes continuing to monitor for wake input, at 402, after presenting the output identifying valid wake input.

In response to determining that the device is not in the push-to-talk mode, the method 400 includes determining whether the known phrase is valid, at 412. In an illustrative example, the processor device 134 determines whether the known phrase 144 is valid based on the wake phrase data 182.

In response to determining that the known wake phrase is not valid, the method 400 includes initiating presentation of output identifying valid wake input, at 414. The valid wake input may include a push-to-talk button, one or more valid wake phrases, or a combination thereof. To illustrate, in response to detecting the known wake phrase 144 and determining that the known wake phrase 144 is not valid, the processor device 134 initiates presentation of the output 154 identifying valid wake input. For example, the output 154 may correspond to an audio message saying "Alexa is not a valid wake phrase for this device. Please say Cortana to input voice commands." The method 400 includes continuing to monitor for wake input, at 402, after presenting the output identifying valid wake input.

In response to determining that the known phrase is valid, the method 400 includes transmitting a portion of an audio stream to a natural language processing service, at 408. In an illustrative example, the processor device 134 initiates transmission of the portion 145 of the audio stream 142 in response to determining, based on the wake phrase data 182, that a wake phrase included in the audio stream 142 corresponds to valid wake phrase. After transmitting the portion of the audio stream to the natural language processing service, the method 400 includes continuing to monitor for wake input, at 402.

Thus, FIG. 4 illustrates an example of a method of providing output identifying valid wake input so that a user may input spoken commands. A system operating according to the method may be used by a user who does not have previous knowledge of valid wake inputs. Accordingly, the method improves a user interface function of a computing device.

Figure 5:
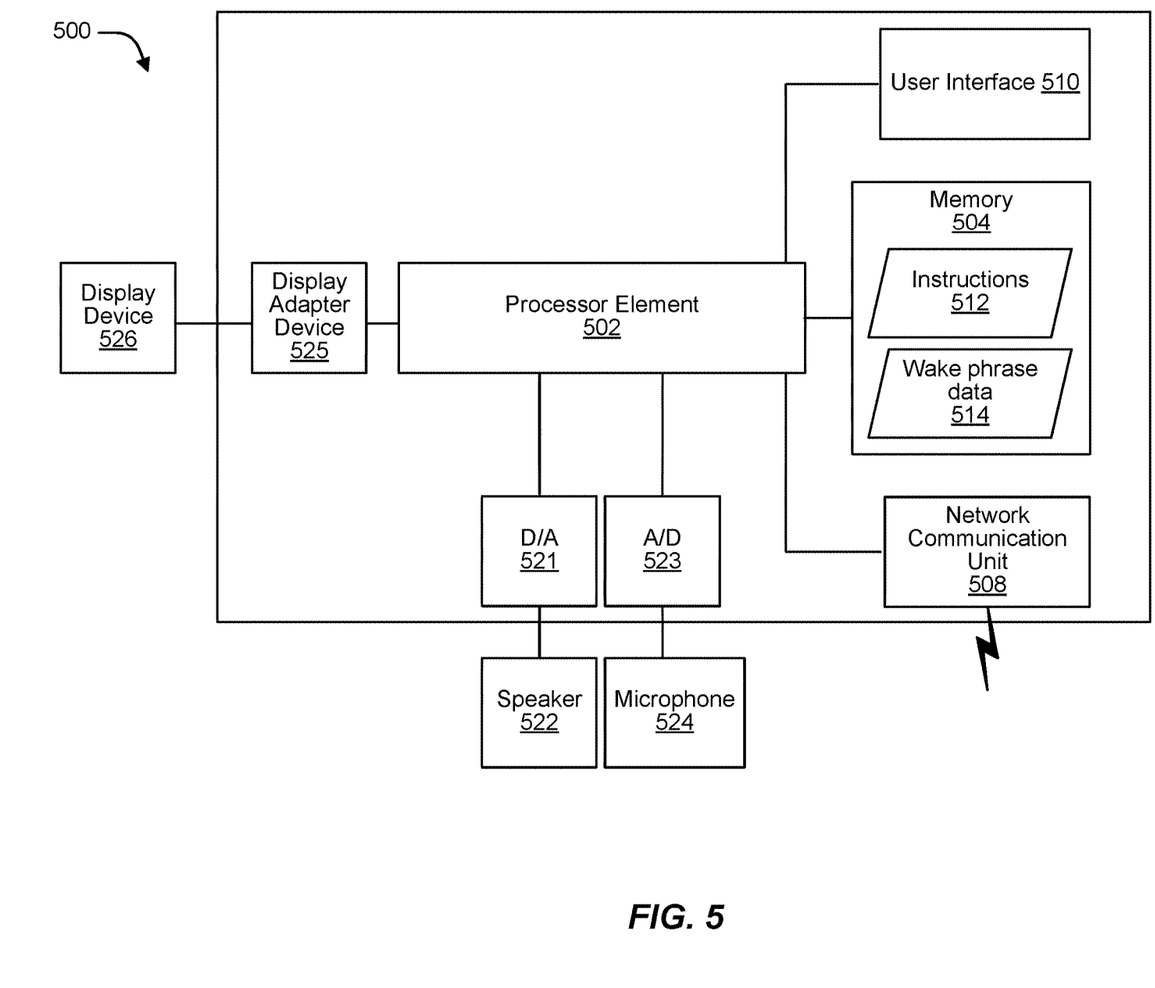
FIG. 5 illustrates a computing device corresponding to a communication device and operable to perform one or more processes or methods disclosed herein.

Referring now to FIG. 5, a block diagram illustrates a computing device 500 that is usable to implement the techniques described herein in accordance with one or more embodiments. For example, in some implementations, the computing device 500 corresponds the communication device 102. As shown in FIG. 5, the computing device 500 can include one or more input/output devices, such as a network communication unit 508 that could include a wired communication component and/or a wireless communications component, which can be coupled to processor element 502. The network communication unit 508 corresponds to one or more transceiver unit(s) that utilize one or more of a variety of standardized network protocols, such as Wi-Fi, Ethernet, transmission control protocol/Internet Protocol (TCP/IP), etc., to effect communications between devices.

The computing device 500 includes a processor element 502 that contains one or more hardware processors, where each hardware processor has a single or multiple processor cores. In one embodiment, the processor element 502 includes at least one shared cache that stores data (e.g., computing instructions) that are utilized by one or more other components of processor element 502. In a particular example, the shared cache corresponds to locally cached data stored in a memory for faster access by components of the processor element 502. In one or more embodiments, the shared cache includes one or more mid-level caches, such as level 2 (L2), level 3 (L3), level 4 (L4), or other levels of cache, a last level cache (LLC), or combinations thereof. Examples of processors include, but are not limited to, a central processing unit (CPU), a microprocessor, and a digital signal processor (DSP), a graphics processing unit (GPU), an application specific integrated circuit (ASIC), and a field-programmable gate array (FPGA). In some implementations, the processor element 502 corresponds to the processor device 134.

FIG. 5 illustrates that a memory 504 is operatively coupled to the processor element 502. In some embodiments, the memory 504 corresponds to a non-transitory medium configured to store various types of data. In an illustrative example, the memory 504 includes one or more memory devices that comprise a non-volatile storage device and/or volatile memory. Examples of non-volatile storage devices include disk drives, optical drives, solid-state drives (SSDs), tap drives, flash memory, read only memory (ROM), and/or any other type memory designed to maintain data for a duration time after a power loss or shut down operation. An example of volatile memory is random access memory (RAM). In the illustrated example, the memory 504 stores instructions 512. The instructions 512 are executable by the processor element 502 to perform one or more of the operations or methods described with respect to FIGS. 1-4. In particular, the instructions 512 are executable by the processor element 502 to initiate presentation of instructions identifying valid wake input in response to detecting a known but invalid wake phrase. The memory 504 further stores wake phrase data 514. The wake phrase data 514 may correspond to the wake phrase data 182.

Persons of ordinary skill in the art are aware that software programs may be developed, encoded, and compiled in a variety computing languages for a variety software platforms and/or operating systems and subsequently loaded and executed by the processor element 502. In one embodiment, the compiling process of the software program transforms program code written in a programming language to another computer language such that the processor element 502 is able to execute the programming code. For example, the compiling process of the software program may generate an executable program that provides encoded instructions (e.g., machine code instructions) for processor element 502 to accomplish specific, non-generic, particular computing functions.

After the compiling process, the encoded instructions are then loaded as computer executable instructions or process steps to the processor element 502 from storage (e.g., the memory 504) and/or embedded within the processor element 502 (e.g., cache). The processor element 502 executes the stored instructions or process steps in order to perform operations or process steps to transform the computing device into a non-generic, particular, specially programmed machine or apparatus. Stored data, e.g., data stored by a storage device, can be accessed by the processor element 502 during the execution of computer executable instructions or process steps to instruct one or more components within the computing device 500.

In the example of FIG. 5, the computing device further includes a user interface 510 that may include a display, positional input device (such as a mouse, touchpad, touchscreen, or the like), keyboard, or other forms of user input and output devices. The user interface 510 can be coupled to processor element 502. Other output devices that permit a user to program or otherwise use the computing device can be provided in addition to or as an alternative to network communication unit 508. When the output device is or includes a display, the display can be implemented in various ways, including by a liquid crystal display (LCD) or a cathode-ray tube (CRT) or light emitting diode (LED) display, such as an organic LED (OLED) display. Some implementations of the computing device do not include the user interface 510.

The computing device 500 further includes a digital to analog converter (D/A) 521 coupled to the processor element 502 and to a speaker 522. In some implementations, the D/A 521 and the speaker 522 correspond to the output device 136. The computing device 500 further includes an analog to digital converter (A/D) 523 coupled to the processor element 502 and to a microphone 524. In some implementations, the A/D 523 and the microphone 524 correspond to the sound sensor 130. The microphone 524 and the A/D 523 are configured to provide a digital representation of sound detected by the microphone 524 to the processor element 502. The D/A 521 and the speaker 522 are configured to output an acoustic signal based on a digital representation of a response received from the processor element 502.

The computing device 500 further includes a display adapter device 525 coupled to the processor element 502 and to a display device 526. In some implementations, the display adapter device 525 and the display device 526 correspond to the output device 136. It should be noted that, in some embodiments, the computing device 500 comprises other components, such as sensors and/or powers sources, not explicitly shown in FIG. 5.

As discussed above, the systems and methods described above with reference to FIGS. 1-5 enable a system to initiate presentation of instructions identifying valid wake input in response to detecting a known but invalid wake phrase. Accordingly, the systems and methods may be more convenient to use for a user who does not have prior knowledge of valid wake input.

In a first particular example, the computing device 500 corresponds to a smart speaker, such as an Amazon Echo® device (Amazon Echo is a registered trademark of Amazon Technologies, Inc. of Seattle, Wash.). The smart speaker device is configured to receive and respond to voice commands spoken by a user.

In a second particular example, the computing device 500 corresponds to a different type of device executing an intelligent personal assistant service, such as Alexa, that is responsive to voice commands.

In a third particular example, the computing device 500 corresponds to a conference endpoint device (e.g., a video and/or voice conference device). The conference endpoint device is configured to exchange audio and/or video signals with another conference endpoint during a video or audio conference. The conference endpoint device is further configured to respond to voice commands using one or more natural language recognition services, such as Alexa, Siri, Cortana, etc.

As illustrated by the various examples, the disclosed embodiments represent an improvement to user interfaces that operate on detected speech. In particular, the disclosed embodiments are more resilient to user error as compared to other systems because the disclosed embodiments present instructions identifying valid wake input. Accordingly, the disclosed systems and methods represent an improvement to how computing devices provide user interfaces.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure.

Use of the term "optionally" with respect to any element of a claim means that the element is required, or alternatively, the element is not required, both alternatives being within the scope of the claim. Use of broader terms such as comprises, includes, and having is understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments are useable in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that has a publication date after the priority date of this application.

What is claimed is:

1. A device comprising:
   one or more processor devices;
   an audio sensor configured to generate an audio stream;
   a speaker device; and
   one or more memory devices storing data including:
   data identifying a wake phrase of a plurality of possible wake phrases, at least one of the plurality of possible wake phrases potentially being a valid wake input;
   data identifying a push-to-talk mode state; and
   instructions executable by the one or more processor devices to:
   detect a wake phrase in the audio stream;
   determine if the device is in a push-to-talk mode based on the push-to-talk mode state data;
   determine that the detected wake phrase is invalid as a wake input if the device is in a push-to-talk mode;
   determine that the detected wake phrase is valid or invalid as a wake input if the device is not in a push-to-talk mode;
   initiate, as a result of determining that the detected wake phrase is invalid as a wake input, presentation of audio output identifying a valid wake input via the speaker device; and
   initiate, as a result of determining that the detected wake phrase is valid as a wake input, communication of a portion of the audio stream following the valid wake input to a natural language processing service.

2. The device of claim 1, further comprising a display device, wherein the instructions are further executable by the one or more processor devices to initiate the presentation of a visual output identifying the valid wake input via the display device.

3. The device of claim 1, wherein the valid wake input if the device is in a push-to-talk mode includes a signal indicating actuation of a push-to-talk button.

4. The device of claim 1, wherein the instructions are further executable by the one or more processor devices to determine that the wake phrase is invalid based on data identifying the wake phrase as invalid.

5. The device of claim 4, wherein the valid wake input includes a valid wake phrase of the at least one of the plurality of possible wake phrases.

6. The device of claim 1, wherein none of the plurality of possible wake phrases are valid as wake input.

7. A computer-readable storage device storing instructions, the instructions executable by one or more processors to:
   access stored data identifying a wake phrase of a plurality of possible wake phrases, at least one of the plurality of possible wake phrases potentially being a valid wake input;
   access stored data identifying a push-to-talk mode state;
   determine if the device is in a push-to-talk mode based on the push-to-talk mode state data;
   determine that the detected wake phrase is invalid as a wake input if the device is in a push-to-talk mode;
   determine that the detected wake phrase is valid or invalid as a wake input if the device is not in a push-to-talk mode;
   initiate, as a result of determining that the detected wake phrase is invalid as a wake input, presentation of output identifying a valid wake input; and
   initiate, as a result of determining that the detected wake phrase is valid as a wake input, communication of a portion of the audio stream following the valid wake input to a natural language processing service.

8. The computer-readable storage device of claim 7, wherein initiating presentation of the output identifying the valid wake input includes initiating output of audio output identifying the valid wake input via a speaker device.

9. The computer-readable storage device of claim 7, wherein initiating presentation of the output identifying the valid wake input includes initiating output of visual output identifying the valid wake input via a display device.

10. The computer-readable storage device of claim 7, wherein the valid wake input if the device is in a push-to-talk mode includes a signal indicating actuation of a push-to-talk button.

11. The computer-readable storage device of claim 7, wherein the instructions are further executable by the one or more processors to determine that the wake phrase is invalid based on data identifying the wake phrase as invalid.

12. The computer-readable storage device of claim 11, wherein the valid wake input includes a valid wake phrase of the at least one of the plurality of possible wake phrases.

13. A method comprising:
- storing, at a memory device, data identifying a wake phrase of a plurality of possible wake phrases, at least one of the plurality of possible wake phrases potentially being a valid wake input;
- storing, at a memory device, data identifying a push-to-talk mode state;
- detecting a wake phrase in the audio stream;
- determining if the device is in a push-to-talk mode based on the push-to-talk mode state data;
- determining that the detected wake phrase is invalid as a wake input if the device is in a push-to-talk mode;
- determining that the detected wake phrase is valid or invalid as a wake input if the device is not in a push-to-talk mode;
- initiating, by one or more processor devices, presentation of output identifying a valid wake input as a result of determining that the detected wake phrase is invalid as a wake input; and
- initiating, by the one or more processor devices, communication of a portion of the audio stream following the valid wake input to a natural language processing service as a result of determining that the detected wake phrase is valid as a wake input.

14. The method of claim 13, wherein initiating presentation of the output identifying the valid wake input includes initiating output of audio output identifying the valid wake input via a speaker device.

15. The method of claim 13, wherein initiating presentation of the output identifying the valid wake input includes initiating output of visual output identifying the valid wake input via a display device.

16. The method of claim 13, wherein the valid wake input if the device is in a push-to-talk mode includes a signal indicating actuation of a push-to-talk button.

* * * * *